Oct. 1, 1940.   L. O. SCOTT   2,216,423
TOBACCO SEEDING MACHINE
Filed April 3, 1939   2 Sheets-Sheet 2
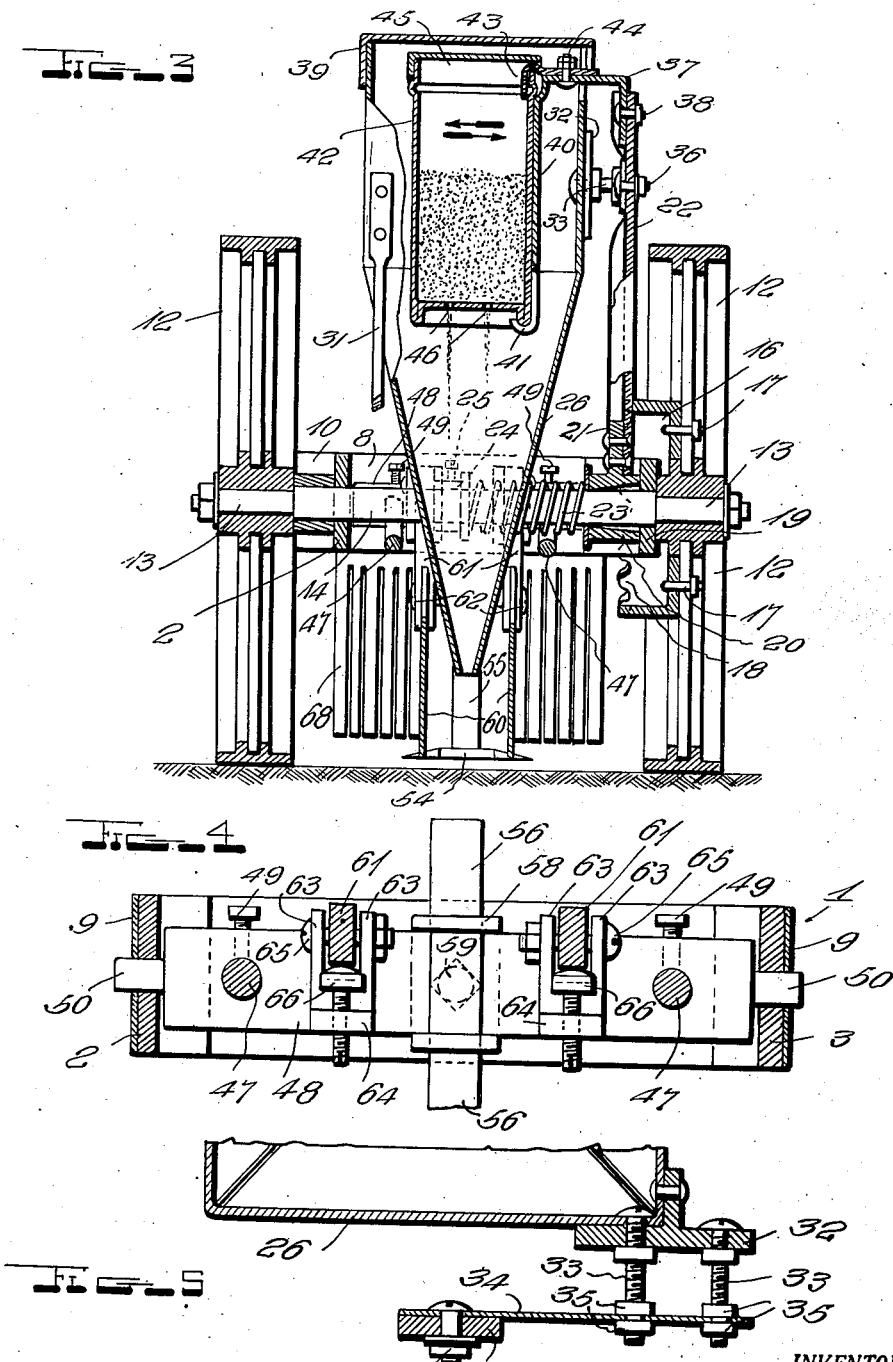
INVENTOR.
Leland O. Scott
BY Jacobi & Jacobi
ATTORNEYS.

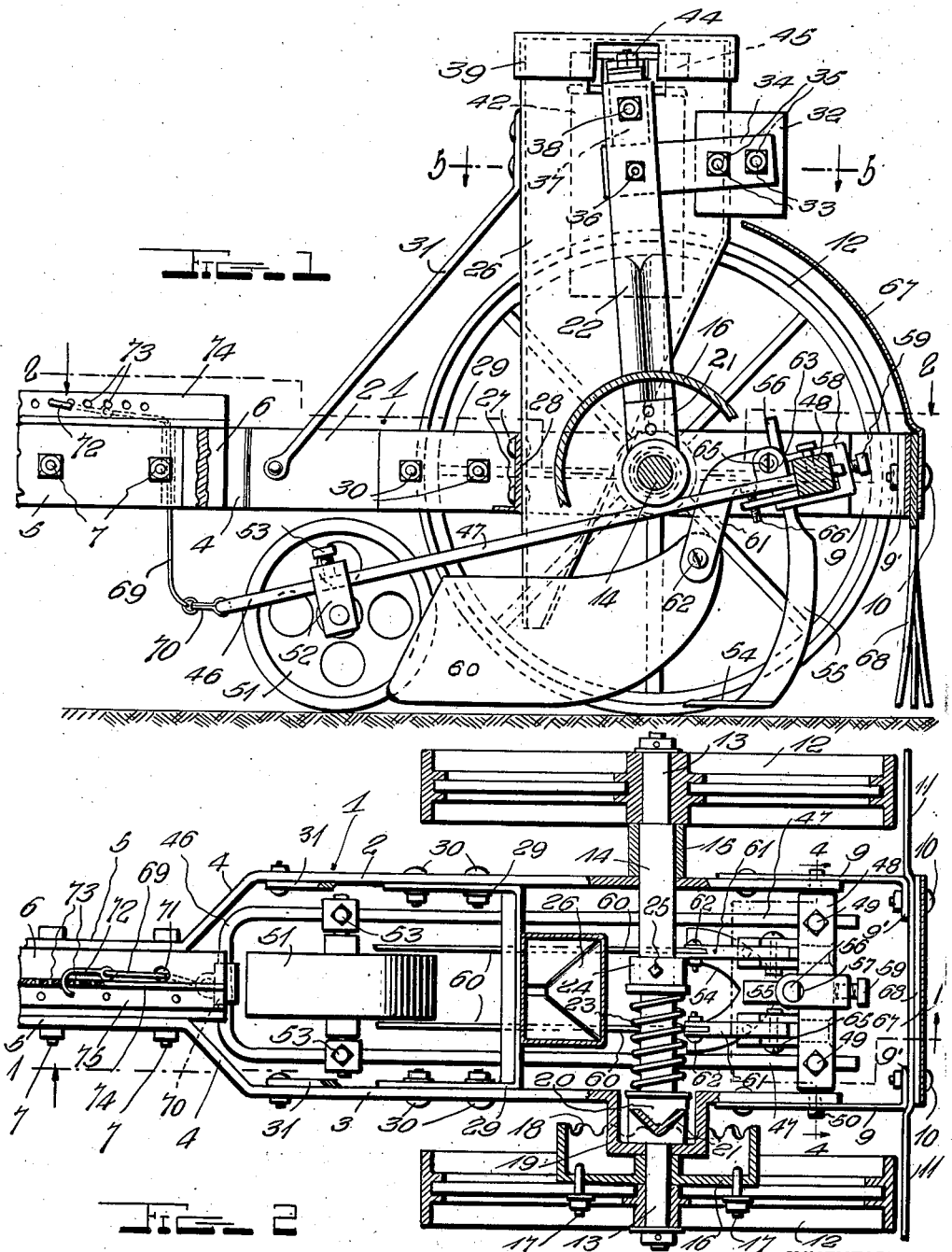

Patented Oct. 1, 1940

2,216,423

UNITED STATES PATENT OFFICE 2,216,423

TOBACCO SEEDING MACHINE

Leland O. Scott, Goldsboro, N. C.

Application April 3, 1939, Serial No. 265,816

12 Claims. (Cl. 111—75)

This invention relates to a seeding machine and more particularly to a machine for sowing tobacco seeds in rows.

At the present time it is customary to sow tobacco seeds in a plant bed by broadcasting the seed over the bed. This causes the seed to be scattered over the bed but the seed are very fine and when they sprout the plants come up so close to each other that the ground can not be worked to remove weeds and fertilize the ground about the growing plants without uprooting or otherwise damaging the plants. It has also been found that circulation of air is cut off and sufficient sunlight prevented from reaching the ground about the plants, thus causing dampness which results in fungus growths such as blue mold.

Therefore, one object of the invention is to provide a seeding machine by means of which the tobacco seeds may be sowed in rows. Thus the plants will grow in rows spaced from each other a sufficient distance to permit air and sunlight to reach the ground and also permit the ground between the rows of growing plants to be properly worked and fertilizer applied and weeds removed.

Another object of the invention is to provide a tobacco sowing machine wherein the seed are shaken from a seed hopper into a funnel shaped guide so mounted that the seed will be deposited upon the ground in a row as the machine is moved across a plant bed.

Another object of the invention is to provide improved means for smoothing the ground upon which the seed is deposited in a row and to also provide the machine with improved means for shielding the falling seed from air currents and thus assure proper sowing of the seed in rows when seeding the plant bed.

Another object of the invention is to provide a tobacco sowing machine which is simple in construction, very easy to operate and not liable to get out of order.

With these and numerous other objects in view, my invention consists in the novel features of construction, combination and arrangement of parts as will be hereinafter referred to and more particularly pointed out in the specification and claims.

The invention is illustrated in the accompanying drawings wherein:

Figure 1 is a view showing the improved tobacco sowing machine partially in side elevation and partially in section along the line 1—1 of Figure 2;

Figure 2 is a view showing the machine partially in top plan and particularly in section along the line 2—2 of Figure 1;

Figure 3 is a vertical sectional view taken transversely through the machine;

Figure 4 is a fragmentary sectional view upon an enlarged scale taken along the line 4—4 of Figure 2; and Figure 5 is a fragmentary sectional view taken along the line 5—5 of Figure 1.

The frame 1 of the improved tobacco sowing machine has side bars 2 and 3, the rear end portions of which are bent to converge as shown at 4 and then rearwardly as shown at 5 and secured against opposite side faces of a push bar or handle 6 by bolts 7. A cross bar or strip 8 is secured to the inwardly bent front ends 9' of strips 9 carried by the side bars by bolts 10 and end portions of this cross bar project from opposite sides of the frame to form scrapers 11 by means of which the wheels 12 are kept clear of mud and soft dirt. The wheels are fixedly mounted upon spindles 13 at ends of a shaft or axle 14 extending transversely of the frame through openings in the side bars. A sleeve or spacer 15 holds one wheel in spaced relation to the side bar 2 and the wheel at the other side of the frame carries a cup-shaped cam 16 which is secured to spikes of the wheel by U-bolts 17 and has its annular wall or flange formed with a scalloped edge 18. The adjacent portion of the side bar 3 is offset outwardly as shown at 19 to receive a sleeve 20 formed with a bore increasing in diameter toward its outer end and through which the axle 14 loosely passes. The sleeve carries an upstanding arm 21 which is V-shaped transversely and to which the lower end of a vertically disposed standard 22 is secured. The lower portion of this standard is also V-shaped transversely and in order to yieldably hold it in engagement with the scalloped edge of the cam disk there has been provided a spring 23 coiled about the axle with its outer end abutting the inner end of the sleeve and its inner end bearing against a collar 24 which surrounds the axle and is releasably secured in an adjusted position thereon by a set screw 25. By shifting the collar along the axle, tension of the spring may be controlled.

A funnel shaped seed guide 26 formed of metal is disposed vertically over the axle with its tapered lower portion or discharge spout back of the axle and secured by rivets 27 to a bridge 28 extending transversely in the frame with its arms 29 secured to the side bars 2 and 3 by bolts 30. Rods 31 which extend diagonally and are secured at their ends to the side bars and the upper portion of the seed guide serve as braces for the seed guide and maintain it in its upright position. A stiff bracket 32 is secured to a forward corner portion of the seed guide near the upper end thereof and this bracket carries threaded stems or bolts 33 upon the outer end portions of which an arm 34 formed from a strip of resilient metal is secured by clamping nuts 35. The rear end of this arm is secured across the standard 22 by a bolt 36 and above the arm the standard carries a bracket 37 which is secured by a bolt 38. This bracket projects into the upper end of the seed guide 26 through registering openings formed in the cover 39 and the adjacent side wall of the guide and its inner end portion is bent to form a depending jaw 40 terminating in a hook 41 for engaging under a seed hopper 42. The companion jaw 43 which engages the upper portion of the hopper is secured to the bracket 37 by a bolt 44 and it will be readily understood that by removing the jaw 43 a filled seed container or hopper may be applied and the jaw then replaced and secured by the bolt to hold the hopper in place. When the hopper is empty it can be easily removed and a new one filled with seed set in place. The cover 45 of the hopper is removed during application of the hopper and then replaced so that the seed, which are very fine, will be prevented from passing out of the hopper except through the perforations 46 formed in its bottom. A suitable number of these perforations are formed in the container or hopper so distributed than when the hopper is vibrated the seed will be sifted from the hopper. Vibration of the hopper is caused by action of the scalloped edge of the cam disk 16 which is engaged by the V-shaped lower portion of the standard 22. Since the bore of the sleeve 20 increases in diameter towards its outer end the sleeve, the standard may have tilting movement transversely of the frame and the seed guide as well as movement longitudinally of the axle and vertical shaking movement will be imparted to the hopper as well as movement transversely of the seed guide. The fact that the seed guide tapers downwardly to its lower end causes the seed to be delivered from the lower end of the guide in a fine stream in close proximity to the ground and the seed will be sowed in a narrow row instead of being broadcast over the plant bed.

The main frame 1 carries an auxiliary frame 46 which extends longitudinally of the main frame between the side bars thereof. This auxiliary frame is formed from a metal bar bent to a U-shape as shown in Figure 2 and having forward ends of its arms 47 passed through a cross bar or bolster 48 and secured by set screws 49. Ends of the bolster are formed with pintles 50 journaled through the forward ends of the side bars 2 and 3 of the main frame to pivotally mount the auxiliary frame. A roller 51 is rotatably supported between bearing blocks 52 carried by side arms of the auxiliary frame and in order to secure the blocks in set positions there have been provided set screws 53. By shifting the blocks along the side arms of the auxiliary frame the angle of the auxiliary frame when the roller is resting upon the ground may be controlled.

At the front end of the auxiliary frame is a blade 54 for smoothing the ground and thus providing a good surface to receive the seed dropping from the seed guide. This blade extends rearwardly from the lower end of a shank 55, the upper end of which is reduced to form a stem 56 engaged through openings 57 formed in the arms of a clamp 58. The clamp straddles the bolster and carries a screw 59 which, when tightened, urges the clamp forwardly and causes gripping engagement with the stem to hold the smoothing blade in an adjusted position. Therefore, the smoothing blade may be set to move forwardly in slightly elevated relation to the general surface of the ground and cut off any mounds encountered and a substantially smooth track will be formed to receive the seed.

When the seed is dropped from the seed guide it should be shielded from air currents blowing transversely of the seeder. In order to do so there have been provided shields in the form of metal plates 60. These shields are disposed vertically at opposite sides of the lower end of the seed guide and have their forward ends curved upwardly to form necks which are secured in the forked lower ends of arms 61 by bolts or equivalent fasteners 62. The arms have their upper ends bent forwardly and mounted between the ears 63 of brackets 64 by bolts 65 and in order to maintain the shields 60 in predetermined spaced relation to the ground there have been provided abutment screws 66 which are threaded vertically through the rearwardly projecting portions of the brackets in position for the arms to rest upon their heads as shown in Figure 4. The plates or shields prevent the falling seeds from being deflected by lateral air currents and since the roller 51 serves to press the seeds into the ground and press loose earth into covering relation to the seed, the seeds will remain in a row and when they sprout the plants will grow in rows. The seeds should also be shielded from air currents blowing towards the front of the seeder and in order to do so there have been provided shields 67 and 68. The shield 67 consists of a longitudinally curved metal plate or strip extending upwardly at a rearward curve from the front end of the main frame in front of the seed guide. The lower end of the shield 67 is secured by bolts 10 in overlapping relation to the upper end of the shield 68 which is formed of leather and cut from its lower end to form a plurality of fingers which will pass over a mound of earth or the like without retarding forward movement of the seeder.

When this seeder is in use a filled hopper 40 is applied and by grasping the rear end of the handle 6 which is of a convenient length the seeder may be propelled forwardly across a plant bed in a straight line. During this forward movement of the seeder the roller 51 rests upon the ground and supports the auxiliary frame in such a position that the smoothing blade 54 and the shields 60 are maintained in slightly elevated relation to the ground. When irregularities in the surface of the earth are encountered by the blade 54, this blade slices its way through them and forms smooth flat upper surfaces substantially even with the general surface of the ground. As the wheels turn the vibrator turns with them and its scalloped edge acts against the lower portion of the standard to shift the standard transversely with a swinging and sliding movement longitudinally of the axle. This causes the seed hopper to be shaken transversely and vertically in the seed guide and the fine tobacco seed will be discharged through the perforations in the bottom of the hopper. As the seed are discharged from the hopper they fall downwardly in the seed guide and upon reaching the lower end thereof pass out through the small opening at the lower end of its tapered lower portion in the form of a stream of seed which drop onto the ground. The plates 60 prevent lateral air current from scattering the seed transversely and the shields 67 and 68 prevent air currents blowing rearwardly of the seeder from deflecting the stream of seeds. Therefore, the seeds will be deposited in a line upon the smoothed path formed by the blade 54 and as the roller 51 passes over the seeds, they will be pressed into the ground and covered with dirt. After the plant bed has been seeded and the seeds sprout, the plants will be in rows and the rows will be so spaced from each other that air and sunlight may reach the ground about the growing plants. This will reduce excessive moisture, minimize the disease hazard and retard the formation of blue mold. The fact that the plants grow in rows also permits the soil to be worked to remove weeds and grass and apply fertilizer when needed.

When the end of the row is reached and it is intended to turn the seeder before starting another row, it is desirable to raise the auxiliary frame and thus move the blade 54 and the shielding plates to an elevated position. Such raising of the blade and shields may also be necessary in order to permit them to pass over a rock or other obstruction while depositing seeds in a row. In order to do so, there has been provided a line or rope 69 which has one end connected to a clip 70 carried by the bridge at the rear end of the auxiliary frame. This line 69 extends upwardly through an opening 71 in the forward portion of the handle and carries a hook 72 for engaging through a selected one of the openings 73 formed in the flange 74 of a plate or strip 75 mounted upon the upper face of the handle and extending longitudinally thereof. By engaging the hook through an opening 73 and leaving a predetermined slackness in the line the handle may be swung vertically to a position in which it may be conveniently grasped and the seeder pushed forwardly to deposit seeds in a row across a plant bed. When, however, an obstruction is encountered or it is desired to turn the seeder at the end of a row it is merely necessary to swing the handle upwardly and slack will be taken out of the line and pull exerted thereby upon the rear end of the auxiliary frame to swing the same upwardly and elevate the blade 54 and the shields 60. After the obstruction has been passed or the turn made the handle will be lowered until the roller again rests upon the ground and the seeder pushed forwardly for depositing seed in a straight line or row.

It will thus be seen that with this improved seeder tobacco seed may be sowed in a plurality of straight lines across a plant bed and when the seeds sprout the plants will grow in rows spaced transversely from each other such a distance that weeds may be removed and fertilizer applied and worked into the ground around roots of the plants. Since the plants are growing in rows air and sunlight may reach the ground and thus prevent excessive moisture which causes blue mold and other fungus growths to form.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

I claim:

1. A tobacco seeder comprising a frame, wheels for said frame, a support mounted vertically for vibratory movement, means for vibrating said support carried by and turning with one of said wheels and engaging said support, a seed container carried by said support, a seed guide surrounding said container and having its lower portion tapered downwardly to form a spout having an open lower end terminating adjacent the ground for delivering seed in a row upon the ground as the seeder is moved across a plant bed, and a resilient connection between the guide and said support.

2. A tobacco seeder comprising a frame, rotary wheels for said frame, an axle carrying said wheels, a seed guide mounted vertically in said frame and having a lower outlet for delivering seed in a row upon the ground as the seeder is moved across a plant bed, a support including a bracket carried by said guide and a standard having its lower end loosely mounted about said axle for vibratory movement, mounting means carried by said standard extending into the seed guide, a seed container mounted vertically in said seed guide by said mounting means, said container having a perforated bottom, and means carried by one wheel for engaging said standard and imparting vibratory movement thereto for agitating said container as the seeder is moved.

3. A tobacco seeder comprising a frame, an axle extending across said frame, wheels carried by said axle, a seed guide disposed vertically in said frame and having a tapered lower portion formed with an outlet at its bottom for delivering seed in a row upon the ground, an upright standard, a mounting for said standard carried by said guide and including a resilient arm extending transversely from the standard, a vibrator carried by one wheel and engaging said standard for imparting vibratory movement to the standard during rotation of the wheel, a bracket carried by said standard and projecting into said guide, and a seed container carried by said bracket within the guide and having perforations in its bottom.

4. A tobacco seeder comprising a frame, an axle extending across said frame, wheels carried by said axle, a seed guide disposed vertically in said frame and having an outlet at its bottom for delivering seed in a row as the seeder is moved across a plant bed, a standard at one side of said guide, a support for said standard carried by said guide and yieldable arm extending transversely of the standard and secured thereto, a sleeve at the lower end of said standard loose about said axle, a spring urging said sleeve toward the adjacent end of said axle, a cam member carried by a wheel and engaging the lower portion of said standard for vibrating the standard during rotation of the wheel, a bracket carried by said standard and extending into the upper portion of the seed guide, and a seed container carried by said bracket within the seed container and having its bottom perforated for sifting seed into the guide when the container and the standard are vibrated.

5. A tobacco seeder comprising a frame, an axle extending across said frame, wheels carried by said axle, a seed guide disposed vertically in said frame and having an outlet at its bottom, a standard disposed vertically at one side of said guide, a mounting carried by said guide, a resilient strip extending transversely of the upper portion of said standard and secured to the standard and the mounting, a sleeve fitted loosely about said axle and secured to the lower end of said standard, a spring about said axle having one end engaging the inner end of said sleeve, a collar about said axle adjustable longitudinally of the axle and engaging the inner end of said spring to tension the spring and urge the sleeve outwardly, a bracket carried by the upper end of said standard and extending into the upper portion of said guide, a seed container carried by said bracket within the guide and having a perforated bottom, and a disc carried by a wheel and having an annular flange formed with a scalloped edge engaged by the lower portion of said standard and serving to vibrate the standard and the seed container to sift seed through the perforation in the bottom of the container during rotation of the wheels as the seeder is moved across a plant bed.

6. A tobacco seeder comprising a frame, wheels for the frame, a seed guide carried by said main frame and provided with a spout for delivering seed in a row as the seeder is moved across a plant bed, a standard mounted for vibrating movement at one side of said guide, an arm extending from said standard into the upper portion of said guide, a clamp carried by said arm for removably supporting a seed container in said guide, means carried by one wheel for imparting vibrating movement to said standard and a seed container carried thereby during rotation of the wheel, and means for shielding seed from air currents as the seeder is moved across a plant bed and the seeds are delivered from the spout of the guide.

7. A tobacco seeder comprising a main frame, wheels for the main frame, an auxiliary frame in the main frame, a seeder guide disposed vertically in the main frame and having an outlet spout for seed extending through the auxiliary frame, a support mounted for vibrating movement at one side of said guide, a seed container carried by said support and disposed within said guide, said container having outlet perforations in its bottom, means carried by a wheel for vibrating said support and the seed container carried thereby during rotation of the wheels as the seeder is moved across a plant bed, means carried by said auxiliary frame for smoothing soil in front of the outlet spout of said guide, a roller carried by the auxiliary frame back of the spout, and means for shielding seed discharged from the spout from air currents.

8. A tobacco seeder comprising a main frame, wheels for said main frame, an auxiliary frame in said main frame pivoted at its forward end for vertical movement, a seed guide disposed vertically in the main frame and having a lower delivery spout extending through said auxiliary frame, a seed container in said guide, a support for said container mounted for vibrating movement at one side of the guide, means for vibrating said support during movement of the seeder across a plant bed, means carried by said auxiliary frame for smoothing soil in front of the delivery spout, a roller carried by said auxiliary frame back of the delivery spout, shields carried by said auxiliary frame at opposite sides of the delivery spout, and shields carried by the main frame at the front thereof.

9. A tobacco seeder comprising a main frame, wheels for said main frame, an auxiliary frame in said main frame pivoted at its forward end for vertical movement, a seed guide disposed vertically in the main frame and having a lower delivery spout extending through said auxiliary frame, a seed container in said guide, a support for said container mounted for vibrating movement at one side of the guide, means for vibrating said support during movement of the seeder across a plant bed, means carried by said auxiliary frame for smoothing soil in front of the delivery spout, a roller carried by said auxiliary frame back of the delivery spout, shields carried by said auxiliary frame at opposite sides of the delivery spout, a sheet of pliable material disposed vertically at the front of the main frame extending downwardly therefrom and slit from its lower edge to provide a plurality of flexible fingers, and a metal sheet extending upwardly from the front end of the main frame and curved rearwardly over the main frame with its rear end terminating adjacent the front of the seed guide, the metal sheet and the pliable sheet constituting wind shields for the front end of the seeder.

10. A tobacco seeder comprising a main frame, wheels for said main frame, an auxiliary frame in the main frame having a bolster extending transversely in the forward portion of the main frame and pivotally mounted therein and a U-shaped yoke extending longitudinally in the main frame with forward ends of its arms adjustably secured through the bolster, a seed guide mounted vertically over the main frame and having its lower portion tapered downwardly to form a discharge spout extending through the main frame and the auxiliary frame, a seed container in said seed guide, a support for said container mounted for vibrating movement, means for imparting vibratory movement to the support and the container during movement of the seeder across a plant bed, a clamp carried by said bolster, a smoothing blade having an upwardly extending shank extending through the clamp and adjustably secured to support the blade in predetermined relation to the surface of the ground, brackets extending rearwardly from said bolster, plates disposed in spaced relation to opposite sides of the discharge spout of said seed guide and constituting wind shields, shanks for said plates extending upwardly from front ends thereof and connected with said brackets for swinging movement to vertically adjusted positions, bearing blocks carried by side arms of said yoke adjacent the rear end thereof, a roller rotatably mounted between said blocks, and a flexible connection between the rear end of said yoke and the rear end portion of the main frame for tilting the auxiliary frame upwardly to a raised position.

11. A tobacco seeder comprising a main frame, wheels for said main frame, a handle extending rearwardly from the main frame, a seed guide mounted vertically in the main frame and having a discharge spout at its lower end, a support for mounting a seed container in said guide, means for vibrating said support to cause sifting of seed from a seed container carried thereby during movement of the seeder across a plant bed, an auxiliary frame extending longitudinally in the main frame and pivoted at its front end for vertical movement, a smoother carried by said auxiliary farme in front of the discharge spout, a roller carried by the auxiliary frame back of the discharge spout, wind shields carried by the auxiliary frame at opposite sides of the discharge spout, and a flexible connection between rear end portions of the frames for swinging the auxiliary frame upwardly when the handle is shifted upwardly to tilt the main frame beyond a predetermined position.

12. A tobacco seeder comprising a main frame, wheels for said main frame, a handle extending rearwardly from the main frame, a seed guide mounted in said main frame, a support for mounting a seed container in said guide, means for vibrating said support during movement of the seeder across a plant bed, an auxiliary frame in said main frame pivotally mounted at its front end for vertical swinging movement relative to the main frame, a roller carried by said auxiliary frame back of said seed guide, a plate extending upwardly from said handle and formed with openings spaced from each other longitudinally of the handle, and a flexible member extending from the rear end of the auxiliary frame and having a hook at its rear end engaged through a selected opening of the plate carried by said handle.

LELAND O. SCOTT.